United States Patent [19]
Wachi

[11] Patent Number: 5,138,595
[45] Date of Patent: Aug. 11, 1992

[54] SERVO CONTROL CIRCUIT FOR OPTICAL DISC APPARATUS

[75] Inventor: Shigeaki Wachi, Tokyo, Japan

[73] Assignee: Sony Corporation, Tokyo, Japan

[21] Appl. No.: 455,159

[22] Filed: Dec. 22, 1989

[30] Foreign Application Priority Data

Jan. 9, 1989 [JP] Japan ................... 1-2587/89

[51] Int. Cl.[5] .............................. G11B 7/09
[52] U.S. Cl. .............................. 369/44.35
[58] Field of Search ............... 369/44.35, 44.36, 44.34, 369/44.23, 32, 44.25, 44.27, 44.29, 44.32, 44.41, 54, 59; 358/342; 360/77.05, 77.11

[56] References Cited

U.S. PATENT DOCUMENTS 4,878,211  10/1989  Suzuki et al. ............... 369/44.35

FOREIGN PATENT DOCUMENTS 0220039  4/1987  European Pat. Off. .
61-039274  4/1986  Japan .
63-146232  7/1988  Japan .

Primary Examiner—Roy N. Envall, Jr.
Attorney, Agent, or Firm—Lewis H. Eslinger; Jay H. Maioli

[57] ABSTRACT

An automatic servo gain control system for an optical disk player apparatus is capable of controlling an open-loop servo gain to be constant, regardless of parameter variations including variations in the optical head actuator gain. The system includes a gain control circuit that varies a gain for a first signal indicative of a positional relationship between the optical head and an optical disk based on a second signal providing light intensity information. The system further includes an oscillator that produces an output at a frequency within a servo frequency band of the optical head actuator and that is introduced into a servo loop via an operational amplifier. Signal values at an input side and an output side of the operational amplifier in the servo loop are compared so as to vary the gain for the first signal based on a difference between the input and output signal values. The system operates to control the input and output signal values to be at a predetermined rate, thereby keeping the open-loop servo gain constant.

20 Claims, 3 Drawing Sheets

SERVO CONTROL CIRCUIT FOR OPTICAL DISC APPARATUS

BACKGROUND OF THE INVENTION

1. Field of the Invention

This invention relates generally to an automatic servo gain control system for an optical disk player apparatus and, more specifically, to an automatic servo gain control system to be used in servo loop that performs positional adjustments of an optical head relative to a optical disk for maintaining the open loop servo gain constant.

2. Description of the Background Art

In an optical disk player apparatus there is known a focus servo system and a tracking servo system for making positional adjustments of the optical head relative to the optical disk. In such servo systems there has been proposed an automatic servo gain control system that automatically controls the gain for a positional error signal, such as a focus error signal or a tracking error signal, in response to a parameter variation, such as variations in the intensity of a light beam reflected from the optical disk due to different operational modes, such as recording, reproduction, and erasing. More specifically because the intensity of the light beam irradiated onto the optical disk is controlled to be at different levels according to the particular operational mode, variations in reflectance of the optical disks can be used in the servo system.

One conventional automatic servo gain control system detects the peak-to-peak value of an S-shaped focus error signal and the peak-to-peak value of a tracking error signal produced as the head traverses the tracks. The system controls the respective peak-to-peak values to be constant so as to perform automatic gain control of the positional error signals.

Although such conventional automatic servo gain control system is capable of dealing with the above-mentioned parameter variations relative to different operational modes, it is unable to deal with variations in the gain or other characteristics of the optical head actuator. Of course, because the optical head actuator gain affects the open-loop gain of the servo loop, the conventional system is unable to provide a constant open-loop gain when the optical head actuator gain varies. Accordingly, the conventional servo gain control system can not provide a stable and reliable optical head servo system that can take into account all possible parameter variations, including variations in the optical head actuator gain.

SUMMARY OF THE INVENTION

Accordingly, it is an object of the present invention to provide an automatic servo gain control system for an optical disk player apparatus that can eliminate the above-noted defects inherent in the prior art.

It is another object of the present invention to provide an automatic servo gain control system for an optical disk player apparatus that can provide a constant open-loop servo gain, regardless of variations in reflected light intensity due to operational mode changes due to changes of reflectance of the disks used and regardless of variations in the optical head actuator gain.

A further object of the present invention is to provide an automatic servo gain control system for an optical disk player apparatus that can provide a constant open-loop gain at a desired frequency within the frequency band of the optical head actuator being used in the apparatus.

In accordance with an aspect of the present invention, in a servo loop for positional adjustment of an optical head relative to an optical disk, an automatic servo gain control system comprises a first circuit in the servo loop for receiving a first signal indicative of a positional relationship between the optical head and the optical disk. This first signal is derived from a light beam reflected from the optical disk into the optical head. A second signal indicative of a light intensity of the light beam is used for varying the gain of the first signal such that a signal level of the second signal is maintained constant, so as to produce a third signal. The system further includes an oscillator that oscillates at a frequency corresponding to a servo frequency band, and a second circuit in the servo loop introduces an output of the oscillator into the servo loop. A third circuit is provided for comparing signal values of the third signal at an input side and an output side of the second circuit in the servo loop and for varying the gain for the first signal based on a difference between the input and output signal values, so as to control the input and output signal values to be at a predetermined constant rate, thereby controlling the open loop gain of the servo loop to be constant.

The above and other objects, features, and advantages of the present invention will be understood from the detailed description given hereinbelow and from the accompanying drawings of illustrative embodiments thereof to be read in conjunction with the accompanying drawings.

DESCRIPTION OF PREFERRED EMBODIMENT

Although the preferred embodiment described hereinbelow relates to a focus servo system, it is to be understood that the present invention is equally applicable to a tracking servo system.

Figure 1:
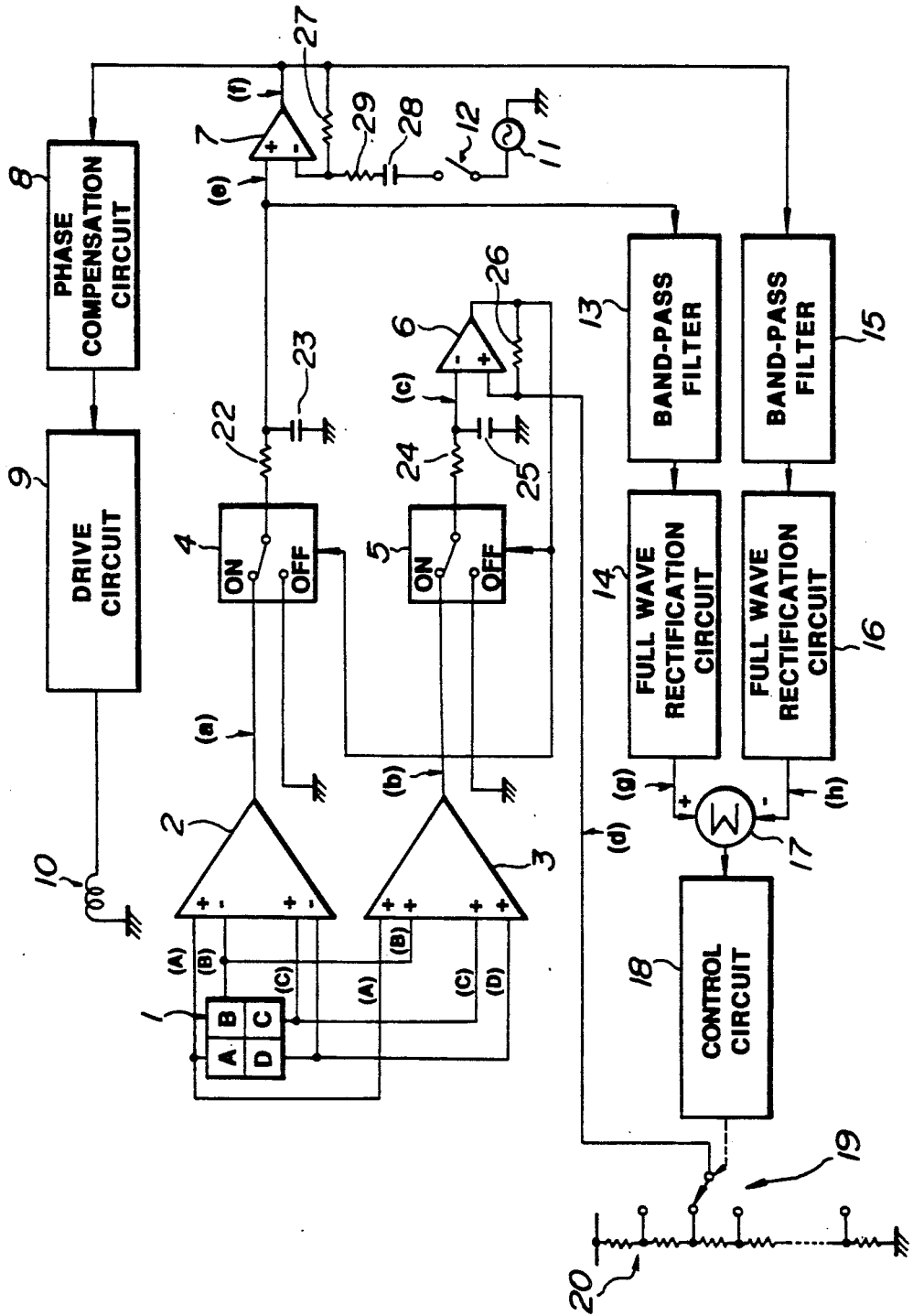
FIG. 1 is a schematic in block diagram form of an optical head servo system incorporated with an automatic servo gain control system according to a preferred embodiment of the present invention.

In the system of FIG. 1, a laser beam is generated by a laser beam generator (not shown) and is irradiated onto an optical disk (not shown). The laser beam is then reflected by the disk and received by a light detector assembly 1 using, for example, the astigmatic method that is well known. The light detector assembly 1 is divided into four light-receiving surfaces A, B, C, and D, and the light received by the respective light-receiving surfaces A, B, C, and D is converted into electric signals (A), (B), (C), and (D), each indicative of the light intensity received by the corresponding light-receiving surface. Each of these electric signals is fed to first and second arithmetic circuits 2 and 3. The first arithmetic circuit 2 calculates a difference between the diagonally paired signals $(A+C)-(B+D)$ to produce a focus error signal (a), and the second arithmetic circuit 3 calculates a sum of all the signals (A+B+C+D) to produce a light intensity signal (b).

The focus error signal (a) is fed to a first analog switch 4 and the light intensity signal (b) is fed to a second analog switch 5. The output of analog switch 4 is filtered and smoothed by a low-pass filter comprising a resistor 22 and a capacitor 23 to derive a focus error signal (e), and the output of analog switch 5 is filtered and smoothed by another low-pass filter comprising a resistor 24 and a capacitor 25 to derive a light intensity signal (c). The light intensity signal (c) is fed to the inverting input terminal of a comparator 6, which has hysteresis characteristics, and a reference voltage signal (d) is fed to the non-inventing input terminal of comparator 6. The output of comparator 6 is returned to the non-inverting input terminal of comparator 6 through a feedback resistor 26. Comparator 6 is self-oscillating due to its hysteresis characteristics, so that the pulse width or duty-cycle of its output changes according to the signal level of the light intensity signal (c). Therefore, the output of comparator 6 is a pulse width modulation (PWM) signal that is fed to synchronously control analog switches 4 and 5 between ON/OFF states based on the pulse duty cycle of the PWM signal. The ON state of analog switches 4 and 5 connects the low-pass filters (22, 23) and (24, 25) to the first and second arithmetic circuits 2 and 3, respectively, and the OFF state of analog switches 4 and 5 connects the inputs to the respective low-pass filters to ground. Thus, it is seen that when the signal level of the light intensity signal (c) is high, the period during which analog switches 4 and 5 are in the ON state is controlled to be short, compared to the situation when light intensity signal (c) is low. Accordingly, the gain for the focus error signal (a) is controlled so that the signal level of the light intensity signal (c) is held constant, that is, is held equal to the reference voltage (d) applied to the non-inverting input terminal of comparator 6, thereby to derive the focus error signal (e). The manner in which reference voltage (d) is derived is described in detail below.

The focus error signal (e) is supplied to an operational amplifier 7 at its non-inverting input terminal. The output signal (f) of operational amplifier 7 is fed to a phase-compensation circuit 8 as a servo signal and the phase-compensated servo signal is fed to a drive circuit 9 to actuate a focus actuator 10. Focus actuator 10 moves an object lens of the optical head in a focus direction to perform the positional adjustment of the optical head relative to the optical disk. The result of this positional adjustment, that is, movement of the optical head relative to the optical disk, is transmitted to light detector 1 through the generated laser beam to form the focus error signal (a), thereby constituting a servo loop for the positional adjustment of the optical head.

The output of operational amplifier 7 is also fed back to the inverting input terminal of operational amplifier 7 through a feedback resistor 27. Operational amplifier 7 also receives an output of an oscillator 11 through a capacitor 28 and a resistor 29. Oscillator 11 is set to oscillate at a frequency within a predetermined servo frequency band, that is, at a frequency that is within the servo frequency band of focus actuator 10. It is preferable to employ the output of the oscillator 11 only during an adjustment period before the normal use of the focus servo system. Therefore, a switch 12 is provided between oscillator 11 and the inverting input terminal of operational amplifier 7, which will be described later. The values of resistors 27 and 29 are selected so that resistor 29 is much larger than resistor 27, so that the oscillating frequency of oscillator 11 does not affect the frequency characteristics of operational amplifier 7.

The focus error signal (e) is also fed to a band-pass filter 13 and the output of band-pass filter 13 is rectified by a full-wave rectification circuit 14 to derive an absolute value signal (g), whose level indicates the absolute value of the output of band-pass filter 13. On the other hand, the output (f) of operational amplifier 7 is also fed to another band-pass filter 15, and the output of band-pass filter 15 is rectified by another full-wave rectification circuit 16 to derive an absolute value signal (h), whose level indicates the absolute value of the output of band-pass filter 15. The transfer function of each band-pass filter 13 and 15 is expressed as:

$$G = s/(s^2 + \alpha s + \beta)$$

(where $\sqrt{\beta}$ is a center angular frequency and $\alpha$ is the constant coefficient representing the sharpness of the bandpass filter).

The center frequency ($f = \sqrt{\beta}/2\pi$) is selected to be the same as the oscillating frequency of oscillator 11.

The absolute value signals (g) and (h) from rectification circuits 14 and 15, respectively, are fed to a third arithmetic circuit 17 to derive a difference signal (g)−(h) that is then fed to a control circuit 18. Control circuit 18 controls a selector circuit 19 to vary the reference voltage (d) that is supplied from a resistance-type potential divider 20 to the non-inverting input terminal of comparator 6.

Figure 2:
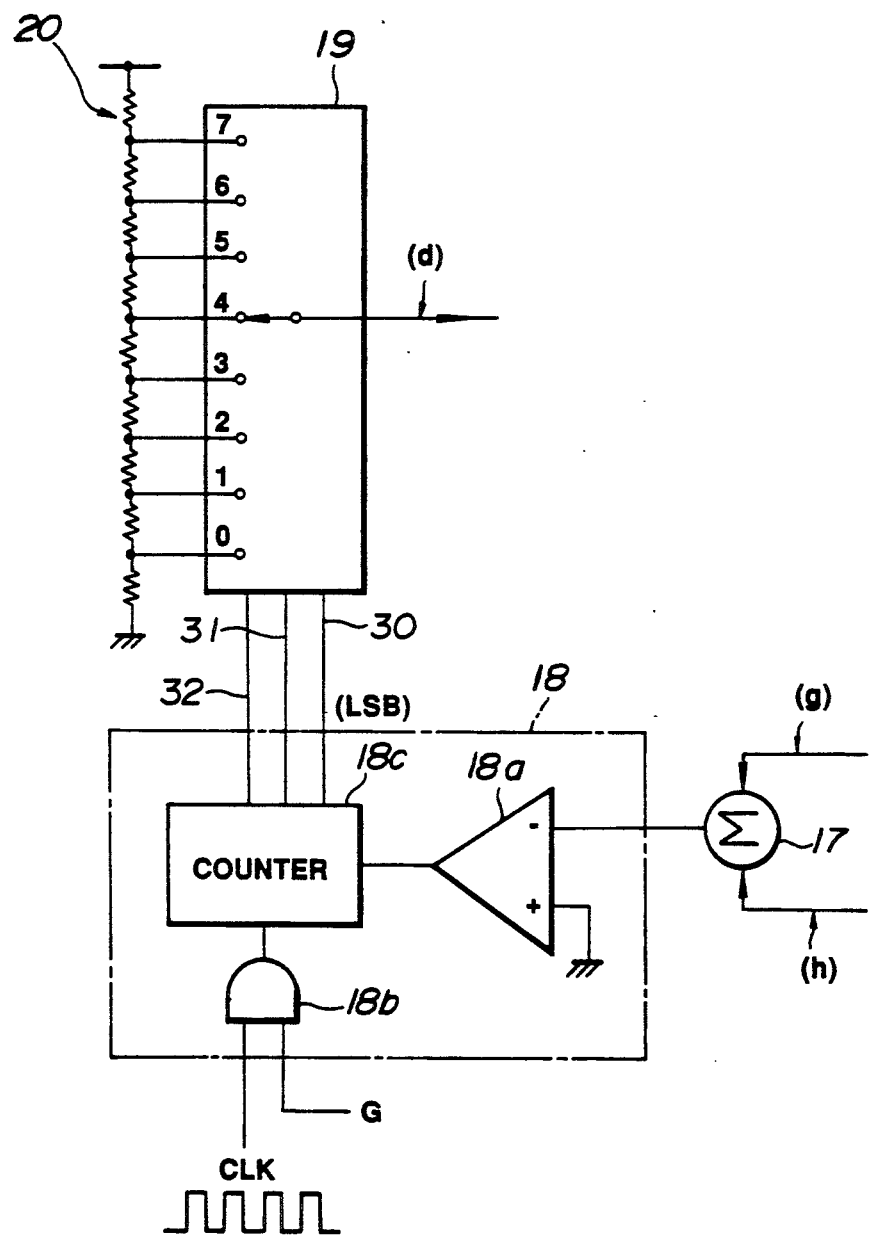
FIG. 2 is schematic diagram showing a portion of the automatic servo gain control system of FIG. 1 in more detail.

As shown in FIG. 2, control circuit 18 generally comprises an inverting amplifier 18a, an AND gate circuit 18b, and a counter 18c. When the difference signal (g)−(h) from arithmetic unit 17 is positive, an the output of inverting amplifier 18a goes negative, which commands the counter signal (g)−(h) to count down. On the other hand, when the difference signal (g)−(h) is negative, the output of inverting amplifier 18a goes positive, which commands counter 18c to count up. A gate signal G is kept high during the period that corresponds to an absolute voltage value of the output from inverting amplifier 18a. Counter 18c counts clock pulses CLK that are input through AND gate circuit 18b and produces a three-bit binary signal on lines 30, 31, and 32, fed to selector circuit 19. Selector circuit 19 decodes the three-bit binary signal into a number from 1 to 7 in decimal and turns on a corresponding one of eight analog switches to extract the reference voltage (d) from the resistance-type potential divider 20. Potential divider 20 comprises nine resistors connected in series between a power source (not shown) and ground. Nodes between the adjacent resistors are connected in turn from low to high to the analog switches 0 to 7 of selector circuit 19, respectively. Of course, the number of analog switches and resistors is selected according to the required degree of reference voltage adjustment, and 0 to 7 is shown only as an example.

Control circuit 18 could be replaced by a known analog-to-digital (A/D) converter and, similarly, a combination of selector circuit 19 and resistance-type potential divider 20 could be replaced by a known digital-to-analog (D/A) converter.

The selected reference voltage (d) is, as described before, applied to the non-inverting terminal of comparator 6 to adjust the gain for the focus error signal (a). Accordingly, control circuit 18 operates to drive the difference signal (g)−(h) toward zero, that is, to make the focus error signal (e) and the servo signal (f) equal.

It is to be appreciated that when the adjustment period, when oscillator 11 is in the circuit, described above is over, it is preferable to fix the reference voltage (d) and this is accomplished by keeping the gate signal G at a low level to prevent the clock signal CLK from entering counter 18c.

Now, the operation of the preferred embodiment as described above will be explained. When switch 12 is opened to prevent the oscillating output of oscillator 11 from entering the inverting input terminal of operational amplifier 7, the focus error signal (e) having a gain that is controlled according to the signal level of the light intensity signal (b) as described above, is fed to phase-compensation circuit 8 as the servo signal (f) through operational amplifier 7. This phase-compensated servo signal operates focus actuator 10 through drive circuit 9, so as to control the focus error signal (a) to be zero. This servo loop, however, can not deal with variations or dispersion in the gain of focus actuator 10, because the gain variations of focus actuator 10 do not affect the light intensity signal (b) in a manner sufficient to control the open-loop gain of the focus servo system.

On the other hand, when switch 12 is closed, the oscillating output of oscillator 11 is introduced into the servo loop through operational amplifier 7 to seemingly disconnect the servo loop at operational amplifier 7. Because the oscillating frequency of oscillator 11 is set to be within the frequency band of focus actuator 10, focus actuator 10 is forced to move in response to the oscillating output introduced into the servo loop through the operational amplifier 7. Accordingly, considering only the oscillating output of oscillator 11 introduced into the servo loop through operational amplifier 7, when the open-loop gain of the servo loop is 0 dB, the oscillating output at an output side of operational amplifier 7 is returned to an input side thereof, thereby keeping the same signal value as that at the output side of operational amplifier 7. In other words, the signal value of the oscillating output at the output side of the operational amplifier varies depending on the open-loop gain of the servo loop, that is, depending on the gain of focus actuator 10 in this embodiment, because those parameter variations affect the light intensity signal (b) adjusted by the gain control circuit comprising analog switches 4 and 5 and comparator 6.

The focus error signal (e) and the servo signal (f) are respectively fed to bandpass filters 13 and 15. Because the center frequency of the pass band of each bandpass filter is set the same as the oscillating frequency of oscillator 11, when the difference between the absolute value signals (g)−(h) from rectification circuits 14 and 16, respectively, obtained by the third arithmetic circuit 17 is zero, the open-loop gain of the servo loop is considered 0 dB. Here, because the difference signal output form the third arithmetic circuit 17 is zero, the output of the inverting amplifier 18a is also zero, so that the gate signal G is kept at a low level to prevent further adjustment of the reference voltage (d) applied to comparator 6. On the other hand, when the difference signal is negative, that is, the absolute value signal (g) is smaller than the absolute value signal (h), the output of inverting amplifier 18a becomes positive, thereby to command counter 18c to count up. Accordingly, the output of counter 18c in the form of a binary signal goes higher, thereby to set the reference voltage (d) to be higher. As the reference voltage (d) goes higher, the period during which analog switches 4 and 5 are in the ON state becomes longer, so that the value of the focus error signal (e) at the input side of operational amplifier 7 is controlled to be higher. Thus, comparator 6 works to control the gain for the focus error signal (a) based on the light intensity signal (b) and the reference voltage (d) applied from the resistance-type potential divider 20 to make equal the focus error signal (e) at the input side of operational amplifier 7 and the servo signal (f) at the output side thereof, so as to control the open-loop gain of the servo loop to be constant. Specifically, 0 dB in this preferred embodiment.

As will be understood from the above, the automatic servo gain control system according to the preferred embodiment of the present invention works to automatically control the open-loop gain of the servo loop to be constant, that is, 0 dB in this particular embodiment, regardless of variations in the light intensity of the reflected light beam received by light detector 1 due to changes of operational modes and in the reflectance of the optical disks used and, further, regardless of variations in the gain of focus actuator 10.

It is to be noted further that because the oscillating output of oscillator 11 introduced into the servo loop functions as an external noise against the normal focus servo operation, it is preferable to close switch 12 only during the adjustment period, so as to perform the automatic servo gain control before the normal operation of the servo system and to hold the selected reference voltage (d) by keeping the gate signal G at a low level and then to start the normal operation. Of course, if the effect of the output of oscillator 11 can be ignored, then switch 12 can be closed to perform the gain control also during the normal operation of the servo system. In this case, switch 12 need not be provided.

Figure 3:
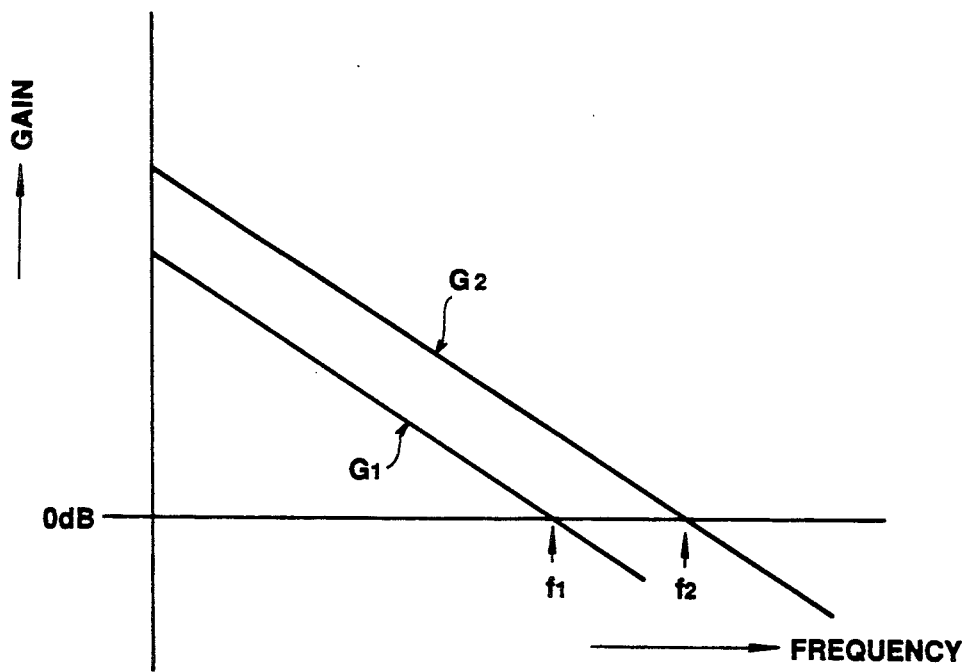
FIG. 3 is a graph of gain versus frequency showing the frequency characteristics obtained by the embodiment of FIG. 1.

As shown in FIG. 3, the automatic servo gain control system as described above further works to provide a desired open-loop gain for a predetermined frequency. Specifically, when the oscillating frequency of oscillator 11 is f1, the frequency characteristics of the servo system are given by G1, while when the oscillating frequency of oscillator 11 is f2, then the frequency characteristics of the servo system are given by G2. This is because the automatic servo gain control system of the present embodiment works to provide a 0 dB open-loop gain for the oscillating frequency of oscillator 11, that is, the 0 dB open-loop gain is obtained at the frequencies f1 and f2, respectively. Accordingly, when the oscillating frequency of oscillator 11 is set at f2, an open-loop servo gain higher than 0 dB is obtained for the frequency f1. For performing this adjustment of the open-loop gain, it is preferable to use a switched capacitive filter as bandpass filters 13 and 15 and to use a common clock for both oscillator 11 and the switched capacitive filters. By changing the frequency of the common clock, a desired open-loop gain is obtained for a given frequency.

It is to be noted that a gain control circuit, such as disclosed in Japanese Patent Publication No. 64-82338 is also applicable in place of the gain control circuit comprising the analog switches 4 and 5, the two low-pass filters (22, 23 and 24, 25) and comparator 6. The contents of the Japanese Patent Publication No. 64-82338 is hereby incorporated by reference for the sake of completeness.

It is to be understood that this invention is not to be limited to the embodiments described above, and that various changes and modifications may be made without departing from the spirit and scope of the invention as defined in the appended claims. For example, although the preferred embodiment was described with respect to a focus servo system, the present invention is equally applicable to a tracking servo system. Furthermore, though in the preferred embodiment the focus error signal (e) at the input side of the operational amplifier and the servo signal (f) at the output side of the operational amplifier are controlled to be equal, the present invention is also applicable where the signals (e) and (f) are controlled to be at some constant ratio other than 1:1.

What is claimed is:

1. In a servo loop for positional adjustment of an optical head relative to an optical disk, an automatic servo gain control system comprises:

first means provided in the servo loop receiving a position signal indicative of a positional relationship between the optical head and the optical disk, said position signal being derived from a light beam reflected from the optical disk into the optical head, and receiving an intensity signal indicative of a light intensity of said light beam, said first means for varying a gain of said position signal based on a reference signal, so that a signal level of said intensity signal is controlled to be constant and for producing an error signal derived from said position signal;

oscillator means for producing an oscillator signal that oscillates at a predetermined frequency selected to be within a servo frequency band;

second means provided in the servo loop receiving said error signal and for producing a servo signal derived from said error signal and said oscillator signal; and third means for comparing signal values of said error signal and said servo signal in the servo loop and producing said reference signal fed to said first means for varying said gain of the position signal based on a compared difference between said error and said servo signal values, so as to control said error signal and said servo signal values to be at a predetermined constant ratio, thereby causing an open loop gain of the servo loop to be constant.

2. The automatic servo gain control system set forth in claim 1, wherein said first means controls said signal level of said intensity signal to be equal to a reference voltage of said reference signal, and said third means controls said reference voltage based on said difference between said error signal and said servo signal values of said second means.

3. The automatic servo gain control system as set forth in claim 2, wherein said third means compares said error signal and said servo signal values by deriving a transformed error signal from said error signal and a transformed servo signal from said servo signal, each of said transformed signals having its center frequency the same as the frequency of said oscillator signal; and by obtaining an absolute signal value for each of the transformed signals, said reference voltage being controlled based on a difference between said obtained absolute signal values of the transformed signals.

4. The automatic servo gain control system as set forth in claim 2, wherein said error signal is fed to said third means through a first bandpass filter having its center frequency the same as the frequency of said oscillator signal to a first full-wave rectification circuit to obtain an absolute signal value thereof, and said servo signal is fed to said third means through a second bandpass filter having its center frequency the same as the frequency of said oscillator signal to a second full-wave rectification circuit to obtain an absolute signal value thereof, said reference voltage of said reference signal is controlled based on a difference between said absolute signal values.

5. The automatic servo gain control system as set forth in claim 3, wherein said second means is an operational amplifier having a negative feedback resistor, said operational amplifier receiving said error signal at its non-inverting input terminal and said oscillator signal at its inverting input terminal.

6. The automatic servo gain control system as set forth in claim 4, wherein said second means is an operational amplifier having a negative feedback resistor, said operational amplifier receiving said error signal at its non-inverting input terminal and said oscillator signal at its inverting input terminal.

7. The automatic servo gain control system as set forth in claim 6, wherein said oscillator signal is fed to said inverting input terminal through a capacitor and a resistor, said oscillator means, said capacitor, and said resistor being connected in series between said inverting input terminal and ground.

8. The automatic servo gain control system as set forth in claim 7, wherein a value of said resistor is much greater than a value of said negative feedback resistor.

9. The automatic servo gain control system as set forth in claim 8, wherein said predetermined constant ratio is 1:1.

10. The automatic servo gain control system as set forth in claim 4, wherein said bandpass filters are switched capacitor filters using a clock common to said oscillator means.

11. In a servo loop for controlling positional adjustment of an optical head that produces and receives a reflected light beam from an optical disk, an automatic servo gain control system comprises:

first means in the servo loop connected to receive a position signal indicating a positional relationship between the optical head and the optical disk, said position signal being derived from the light beam reflected from the optical disk back to the optical head, and connected to receive an intensity signal indicating intensity of said reflected light beam for varying a gain of said position signal based on a reference signal, so that a signal level of said intensity signal is controlled to be constant and for producing an error signal derived from said position signal at an output of said first means;

an oscillator producing an oscillator signal at an output that oscillates at a predetermined frequency selected to be within a servo frequency band;

second means receiving said error signal and said oscillator signal for selectively utilizing said oscillator signal to produce a servo signal; and third means for comparing signal values or said error signal and said servo signal and for producing said reference signal fed to said first means based on a compared difference between said error signal and said servo signal values, so as to control said error signal and said servo signal values to be at a predetermined constant ratio, thereby causing an open loop gain of the servo loop to be constant.

12. The automatic servo gain control system as set forth in claim 11, wherein said first means controls said signal level of the intensity signal to be equal to a reference voltage of said reference signal, and said third means controls said reference voltage based on said difference between said error signal and said servo signal values.

13. The automatic servo gain control system as set forth in claim 12, wherein said third means compares said error signal and said servo signal values by deriving a transformed error signal from said error signal and a transformed servo signal from said servo signal, each of said transformed signals having its center frequency the same as the frequency of said oscillator signal; and by obtaining an absolute signal value for each of said transformed signals; said reference voltage being controlled based on a difference between said obtained absolute signal values of said transformed signals.

14. The automatic servo gain control system as set forth in claim 12, wherein said error signal is fed to said third means through a first bandpass filter having its center frequency the same as the frequency of said oscillator signal to a first full-wave rectification circuit to obtain an absolute signal value thereof, and said error signal is fed to said third means through a second bandpass filter having its center frequency the same as the frequency of said oscillator signal to a second full-wave rectification circuit to obtain an absolute signal value thereof, said reference voltage of said reference signal is controlled based on a difference between said absolute signal values.

15. The automatic servo gain control system as set forth in claim 13, wherein said second means is an operational amplifier having a negative feedback resistor, said operational amplifier receiving said error signal at its non-inverting input terminal and said oscillator signal at its inverting input terminal.

16. The automatic servo gain control system as set forth in claim 15, further comprising switch means for selectively connecting said oscillator signal to said operational amplifier.

17. The automatic servo gain control system as set forth in claim 14, wherein said second means is an operational amplifier having a negative feedback resistor, said operational amplifier receiving said error signal at its non-inverting input terminal and said oscillator signal at its inverting input terminal.

18. The automatic servo gain control system as set forth in claim 17, wherein said oscillator signal is fed to said inverting input terminal through a capacitor and a resistor, said oscillator, said capacitor, and said transistor being connected in series between said inverting input terminal and ground.

19. The automatic servo gain control system as set forth in claim 18, wherein a value of said resistor is much greater than a value of said negative feedback resistor.

20. The automatic servo gain control system as set forth in claim 19, wherein said predetermined constant is 1:1.

* * * * *